(12) United States Patent
Gretz

(10) Patent No.: US 7,470,859 B1
(45) Date of Patent: Dec. 30, 2008

(54) CABLE SUPPORT ASSEMBLY FOR MINIMIZING THE BEND RADIUS OF CABLES

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/900,829

(22) Filed: Sep. 13, 2007

Related U.S. Application Data

(63) Continuation-in-part of application No. 11/471,151, filed on Jun. 20, 2006, now Pat. No. 7,304,240.

(51) Int. Cl.
*H02G 3/04* (2006.01)

(52) U.S. Cl. .............. 174/72 A; 174/68.3; 174/96; 174/70 C; 174/97; 248/49; 138/107; 52/220.1

(58) Field of Classification Search .......... 174/72 A, 174/96, 97, 98, 100, 101, 68.3, 99 R, 70 C, 174/48, 95; 439/207; 52/220.1, 220.5; 138/107, 138/162
See application file for complete search history.

(56) References Cited

U.S. PATENT DOCUMENTS

| | | | |
|---|---|---|---|
| 3,243,754 A | * | 3/1966 | Miller .................. 439/207 |
| 3,302,350 A | | 2/1967 | Brown et al. |
| 4,857,670 A | | 8/1989 | Frank et al. |
| 5,146,718 A | * | 9/1992 | Baskett .................. 52/11 |
| 5,523,529 A | | 6/1996 | Holliday |
| 5,709,249 A | | 1/1998 | Okada et al. |
| 6,399,883 B1 | | 6/2002 | Lhota |

* cited by examiner

*Primary Examiner*—Dhiru R Patel

(57) ABSTRACT

A cable support assembly for routing electrical, communication, or data cables throughout a building. The cable support assembly includes cable trays and brackets for securing the cable trays to a vertical surface. Tray couplers are provided for coupling trays together. The brackets include an L-shaped support member and a hinge arm pivotally attached to the support member. The hinge arm portion of the bracket may be rotated downwards for loading of a cable tray therein and then rotated upwards and latched to the base members to lock the cable tray in place. Ninety-degree bend and T-shaped cable tray sections are also provided. Adjacent cable tray sections may be joined with couplers to create a cable raceway or support assembly in which the cable tray provides support for any electrical, communication, or data cables installed therein.

19 Claims, 18 Drawing Sheets

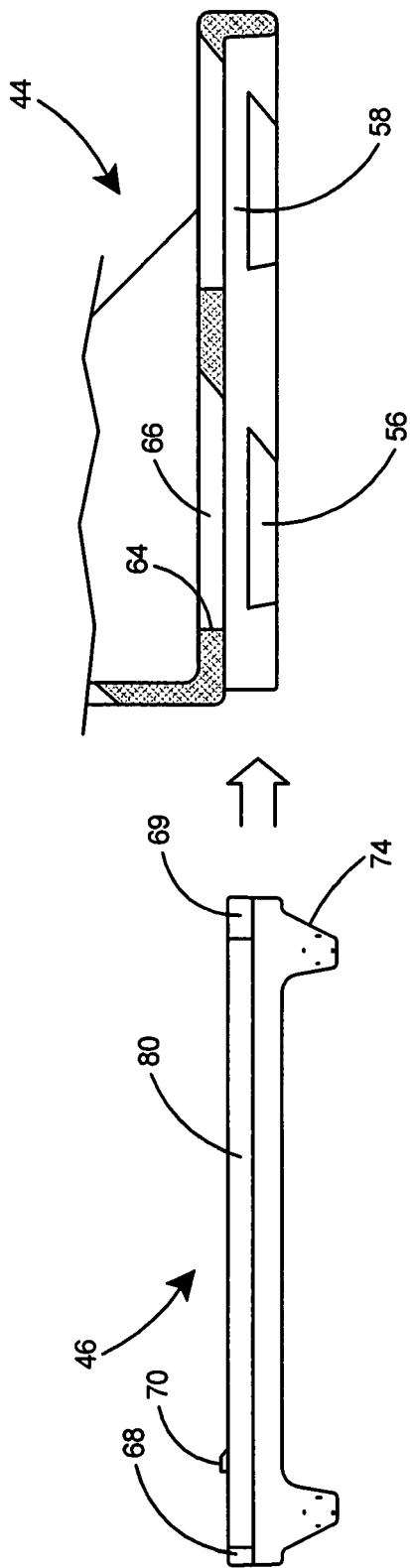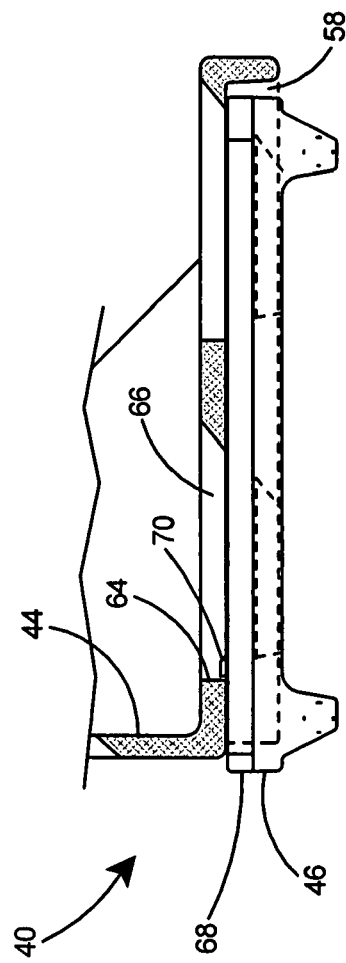
Fig. 11A
Fig. 11B

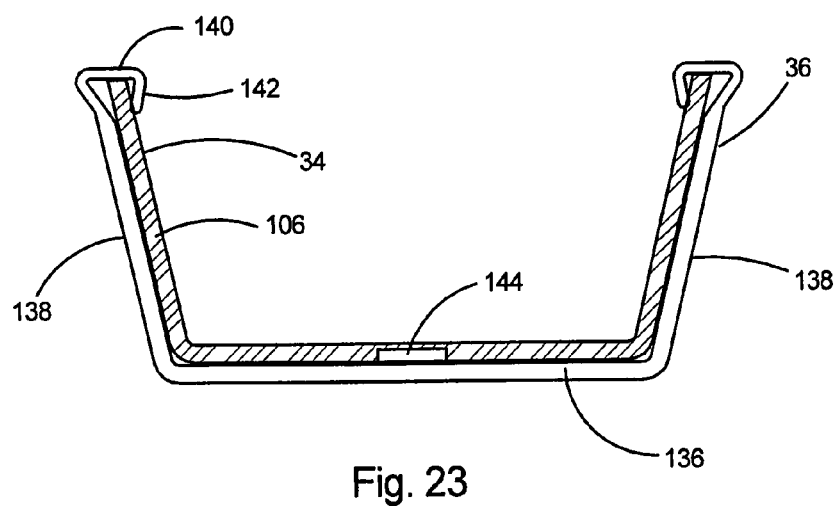
Fig. 23
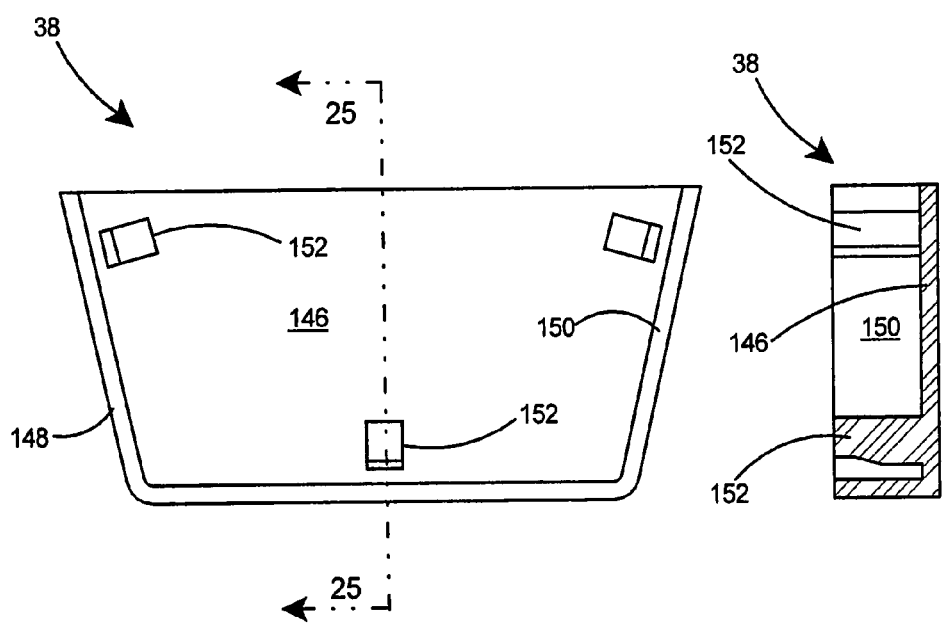
Fig. 24
Fig. 25

CABLE SUPPORT ASSEMBLY FOR MINIMIZING THE BEND RADIUS OF CABLES

This application is a Continuation-In-Part of U.S. patent application Ser. No. 11/471,151 filed Jun. 20, 2006 now U.S. Pat. No. 7,304,204 the entire contents of which are incorporated herein by reference.

FIELD OF THE INVENTION

This invention relates to cable supports and specifically to a cable support assembly or cable raceway that supports electrical cables in such a manner that the bend radius of individual cables is minimized.

BACKGROUND OF THE INVENTION

Cable raceways are used for supporting high or low voltage cables in residences and commercial buildings. One such cable raceway system was proposed in U.S. patent application Ser. No. 11/471,151, which shares common ownership and inventorship with the present invention and has been incorporated herein by reference thereto. The cable raceway system of the parent application included a cable tray that was supported from an overhead support that included a pivoting hinge arm. The hinge arm was capable of being released thereby allowing downward rotation of the hinge arm and the cable tray to permit inspection of any cables within the cable tray or the addition of additional cables if desired.

The cable raceway system of U.S. patent application Ser. No. 11/471,151 thereby provided a system for eliminating the bending or sagging of cables or bundles of cables. Bending or sagging of conductors can adversely affect the data transmission rate, which becomes very critical in cables having higher transmission rates, such as Category 5 telecommunications cables.

The current invention provides enhancements over the cable raceway of the parent application, including a mechanism for supporting the cable raceway from a vertical surface such as a wall and an improved coupler for securing various cable tray portions together. Additionally there are provided 90-degree bends and T-raceway portions for added functionality in constructing cable raceway systems. The cable support assembly of the present invention includes a hinged arm that can be pivoted downward to enable easy lowering of the cable tray, when desired, to facilitate inspection, repair, or installation of additional cables.

SUMMARY OF THE INVENTION

The invention is a cable support assembly for routing electrical, communication, or data cables throughout a building. The cable support assembly includes cable trays of various configurations and brackets for securing the cable trays to a vertical surface. Tray couplers are provided for coupling tray sections together. The L-shaped brackets include a vertical arm, a horizontal arm, and a hinge arm pivotally attached at one end to the horizontal arm. The releasable hinge arm is adapted to hold a cable tray and can be closed in the up position on the bracket or released and rotated downwards. A series of hinge arms may be mounted to support several cable trays and adjacent cable trays joined together with a coupler to form a cable raceway system. A 90-degree bend cable tray and a T-shaped cable tray are provided for enhanced flexibility in forming a cable raceway. The resultant cable raceway or cable support assembly provides support for any electrical, communication, or data cables installed therein.

OBJECTS AND ADVANTAGES

Several advantages are achieved with the cable support assembly of the present invention, including:

(1) The hanger brackets of the cable support assembly are located exterior of the cable tray, thereby ensuring that the cables or cable bundles are supported by the cable tray and not by the hangers, thereby eliminating any possibility of cable sag which could be detrimental to the data transfer capabilities of the installed cables.

(2) The cable brackets of the present invention provide releasable hinge arms that allow insertion of the cable trays after the brackets have been secured to the wall.

(3) The cable brackets include a closing mechanism that enables the cable tray sections to be securely held in the up position after the cable tray sections are loaded within the brackets.

(4) The closing mechanism facilitates easy release of the cable tray sections for inspection or repair of existing cables or easy installation of additional cables.

(5) The closing mechanism is releasable, thereby enabling lowering of one side of the cable tray when released. As a result the cable tray sections continue to support the cables in the lowered position. This provides enhanced protection of the cables or cable bundles over prior art cable trays in which the cable trays must be snapped off or completely removed and leave the cables supported only by the hangers.

These and other objects and advantages of the present invention will be better understood by reading the following description along with reference to the drawings.

DESCRIPTION OF THE DRAWINGS

FIG. 11A is a side view depicting the bottom portion in alignment with the top portion to be inserted therein to form the frame member of FIG. 2.

FIG. 11B is a side view depicting the bottom portion fully inserted and locked within the channel of the top portion thereby forming the frame member of FIG. 2.

FIG. 23 is an end view of the coupler with a cable tray installed therein.

FIG. 24 is a front view of a preferred embodiment of an end cap according to the present invention.

FIG. 25 is a sectional view of the end cap taken along line 25-25 of FIG. 4.

INDEX TO REFERENCE NUMERALS IN DRAWINGS

| | |
|---|---|
| 30 | cable support assembly or cable raceway |
| 32 | bracket |
| 34 | cable tray |
| 36 | coupler |
| 38 | end cap |
| 40 | frame member |
| 42 | hinge arm |
| 44 | top portion of frame member |
| 46 | bottom portion of frame member |
| 48 | vertical arm of top portion |
| 50 | horizontal arm of top portion |
| 51 | planar mounting surface |
| 52 | brace |
| 54 | lower edge of top portion |
| 56 | guide |
| 58 | channel |
| 60 | aperture |
| 62 | open area of top portion |
| 64 | flat edge |
| 66 | opening |
| 67 | flat top surface of bottom portion |
| 68 | stop |
| 69 | beveled front edge of top portion |
| 70 | tab |
| 72 | end of bottom portion |
| 74 | pair of legs |
| 76 | pin |
| 76A | inner pin |
| 76B | outer pin |
| 78 | upper edge of bottom portion |
| 80 | wing |
| 82 | pivot end of hinge arm |
| 84 | closing end of hinge arm |
| 86 | hook on closing end of hinge arm |
| 88 | opening |
| 90 | outer end of bracket |
| 92 | outer leg of hinge arm |
| 98 | vertical surface |
| 100 | fastening arrangement |
| 102 | fastener |
| 104 | bottom wall of cable tray |
| 106 | sidewall of cable tray |
| 108 | end of cable tray |
| 110 | beveled edge of cable tray |
| 112 | top edge of cable tray |
| 114 | T-shaped cable tray member |
| 116 | first cable tray portion |
| 118 | second cable tray portion |
| 120 | sidewall |
| 122 | bottom wall |
| 124 | 90-degree cable tray member |
| 126 | first cable tray portion |
| 128 | second cable tray portion |
| 130 | third cable tray portion |
| 132 | sidewall |
| 134 | bottom wall |
| 136 | bottom wall of coupler |
| 138 | sidewall of coupler |
| 140 | top lip of coupler |
| 142 | inner lip |
| 144 | separator tab |
| 146 | end wall of end cap |
| 148 | outer edge of end cap |
| 150 | peripheral wall |
| 152 | post |
| $\theta_1$ | angle of sidewall with respect to the top edge |

DETAILED DESCRIPTION OF THE INVENTION

Figure 27:
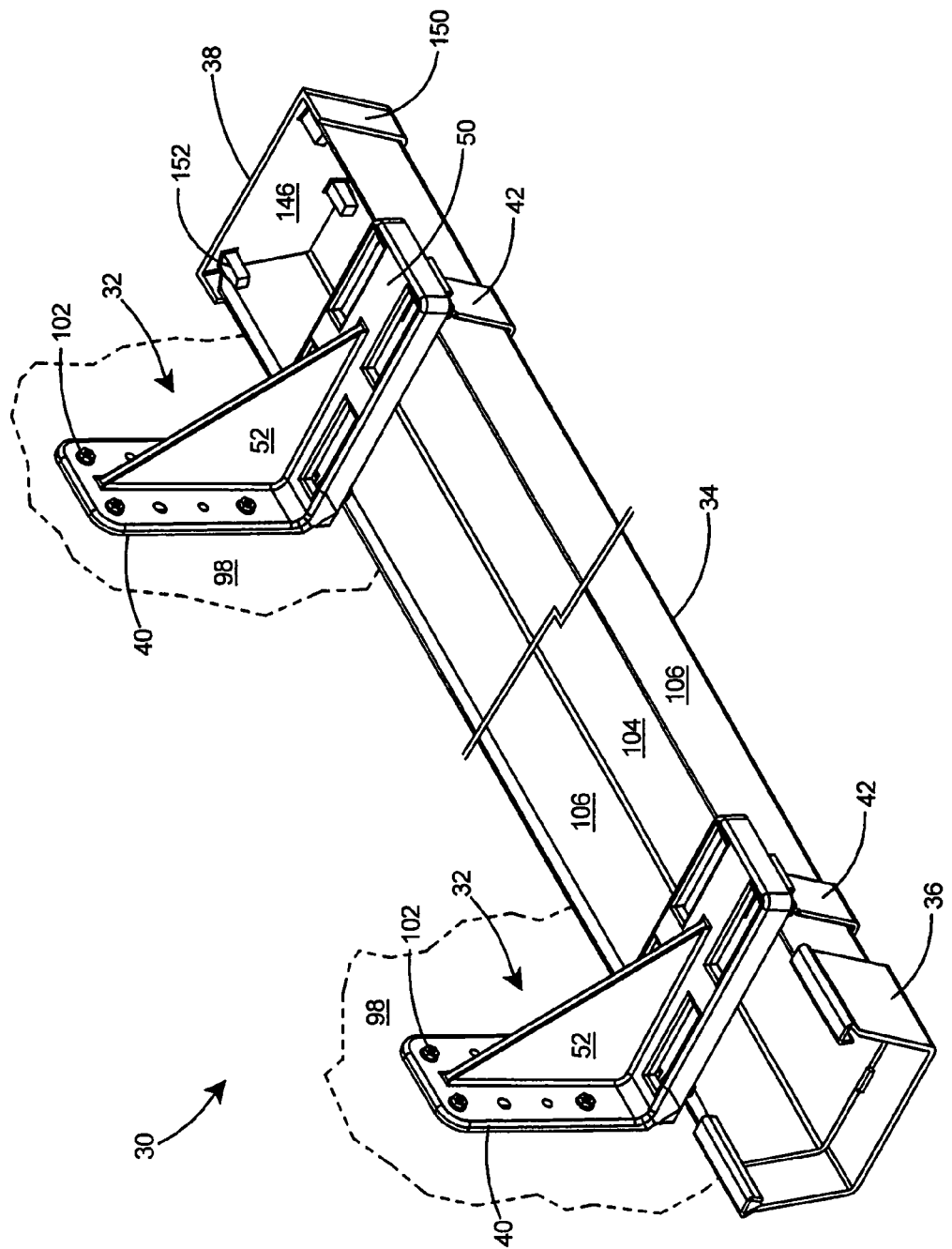
FIG. 27 is a perspective view of a preferred embodiment of a cable support assembly or cable raceway according to the present invention.

With reference to FIG. 27 there is shown a preferred embodiment of a cable support assembly 30, which includes a plurality of brackets 32 and one or more elongated cable trays 34. The cable support assembly 30 can further include a coupler 36 for securing cable trays 34 together at their ends and an end cap 38 for terminating the end of a cable tray 34.

Figure 1:
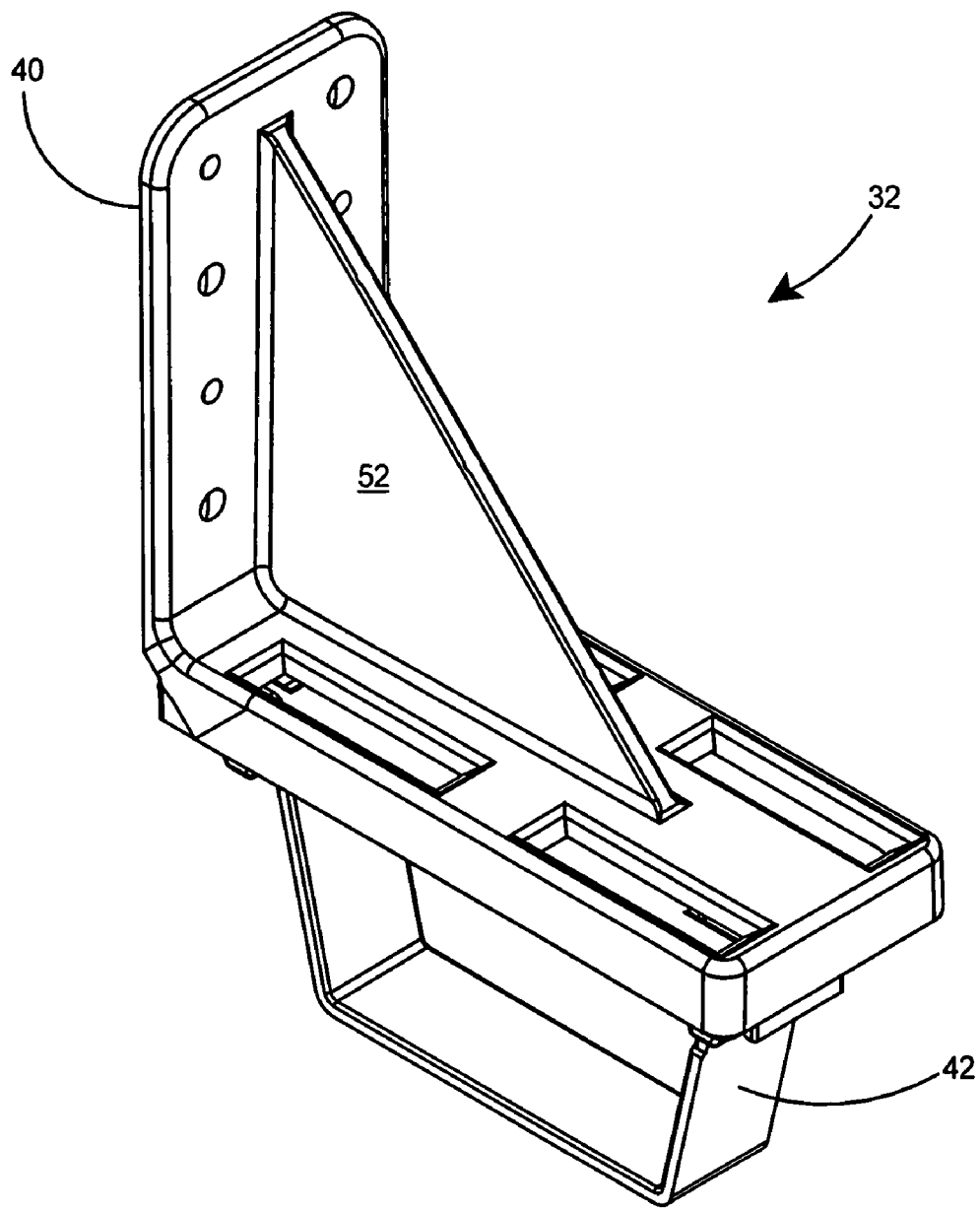
FIG. 1 is a perspective view of the preferred embodiment of a bracket that forms a portion of a cable support assembly according to the present invention.

With reference to FIG. 1 there is shown a preferred embodiment of a bracket 32 according to the present invention. The bracket 32 includes an L-shaped frame member 40 and a hinge arm 42.

Figure 2:
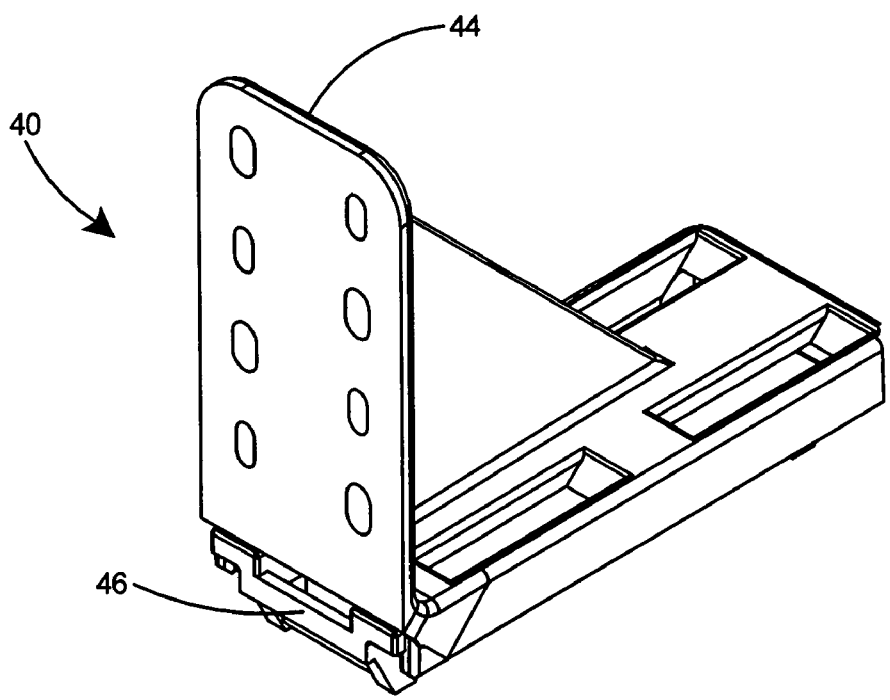
FIG. 2 is an upper perspective view of an L-shaped frame of the bracket depicted in FIG. 1.

Referring to FIG. 2, the frame member 40 includes a top portion 44 and a bottom portion 46. The top portion 44 and bottom portion 46 are preferably each molded of plastic in one piece.

Figure 3:
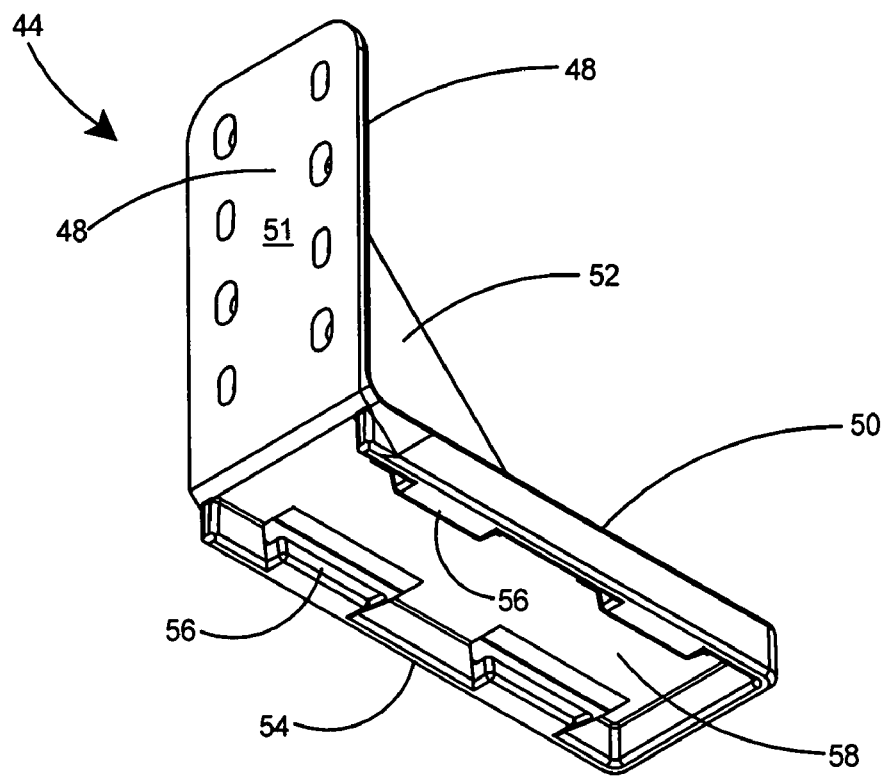
FIG. 3 is a lower perspective view of the top portion of the frame depicted in FIG. 2.

Referring to FIGS. 3-7 there are shown various views of an especially preferred embodiment of the top portion 44 of the bracket. As shown in FIG. 3, the top portion 44 includes a vertical arm 48 and a horizontal arm 50. The outer side of the vertical arm 48 includes a planar mounting surface 51 thereon. An integral brace 52 extends between the vertical arm 48 and the horizontal arm 50 thereby providing strength and stiffening the top portion 44. The top portion 44 further includes a lower edge 54, guides 56 extending inwards horizontally from the lower edge 54, and a channel 58 between the guides 56 and the horizontal arm 50 at the lower end of the top portion 44.

Figure 4:
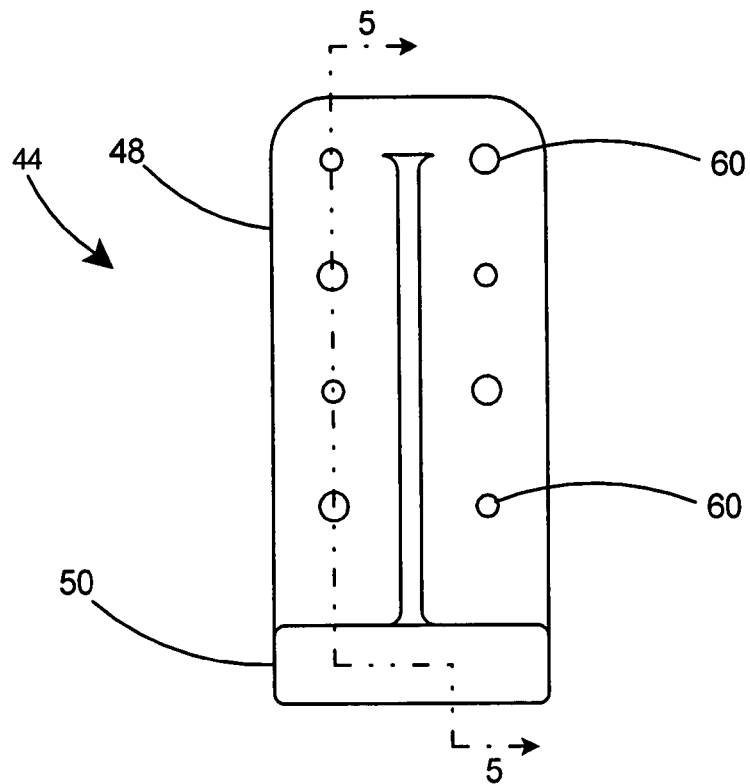
FIG. 4 is an end view of the top portion of the frame depicted in FIG. 2.

As shown in FIG. 4, a plurality of apertures 60 is provided within the vertical arm 48 of the top portion 44. The apertures 60 are provided in both a large and small diameter to accommodate large and small fasteners as will be described herein.

Figure 5:
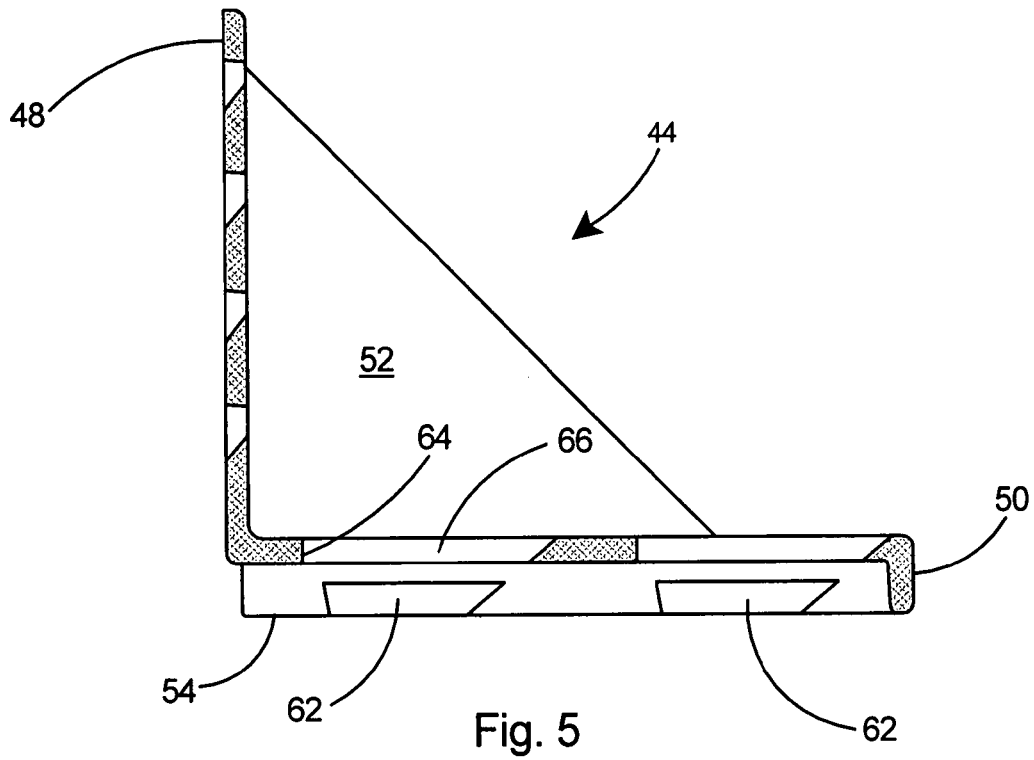
FIG. 5 is a sectional view of the top portion of the frame taken along line 5-5 of FIG. 4.
Figure 6:
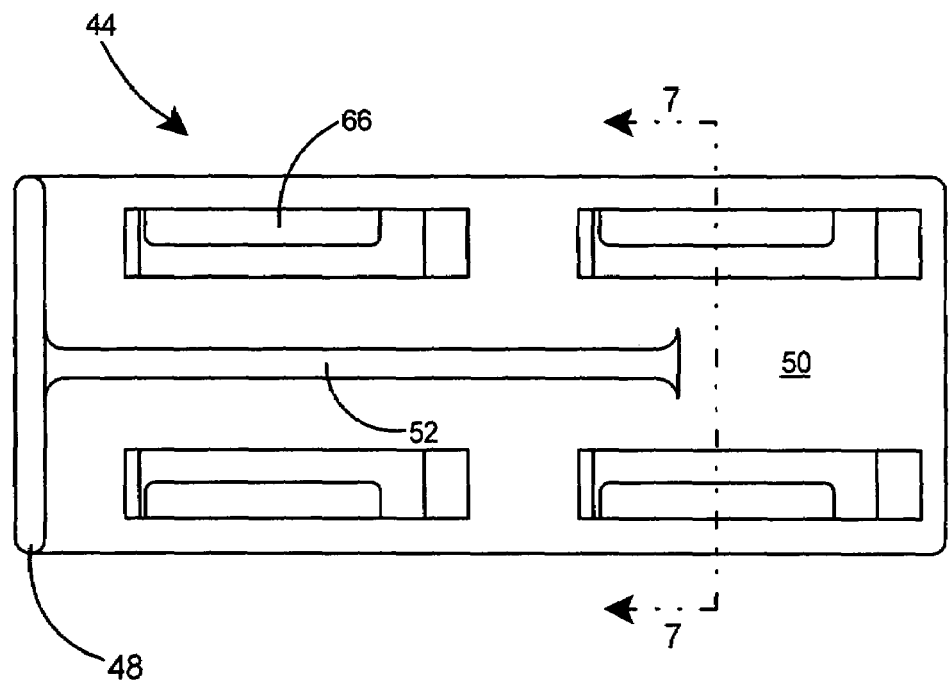
FIG. 6 is a top view of the top portion of the frame depicted in FIG. 2.
Figure 7:
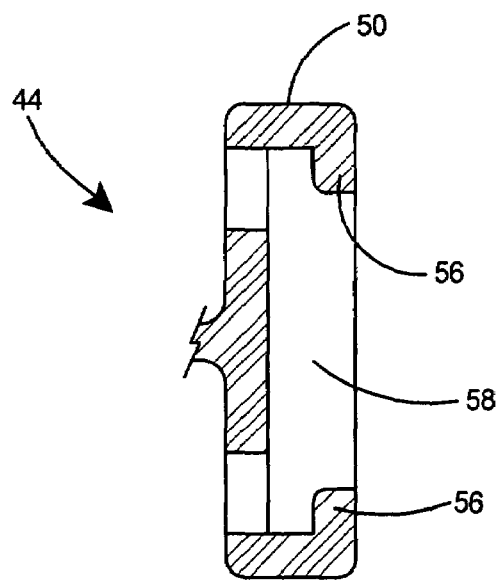
FIG. 7 is a sectional view of the top portion of the frame taken along line 7-7 of FIG. 6.

As shown in FIG. 5, open areas 62 are provided along the lower edge 54 of the top portion 44 and a flat edge 64 is provided in an opening 66 if the horizontal arm 50. As shown in FIGS. 6 and 7, the guides 56 and the horizontal arm 50 define the channel 58.

Figure 8:
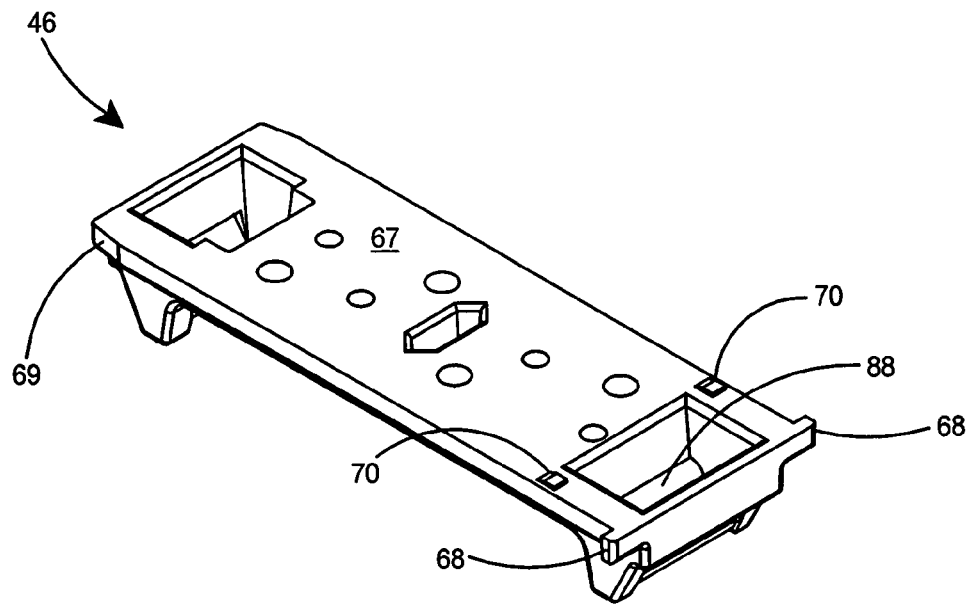
FIG. 8 is a top perspective view of a bottom portion of the frame depicted in FIG. 1.
Figure 9:
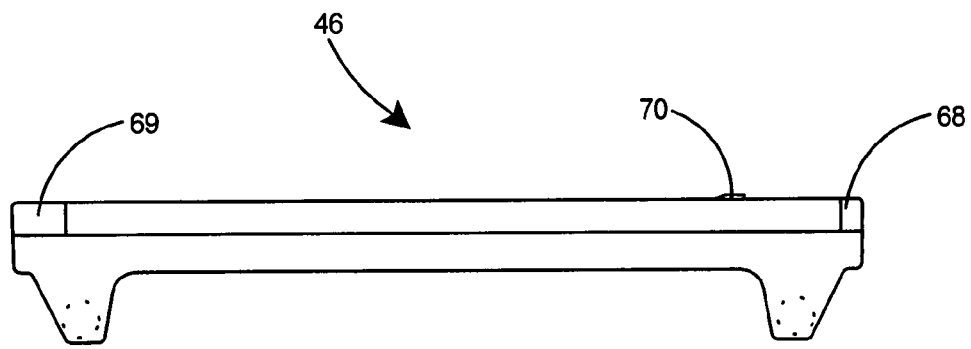
FIG. 9 is a side view of the bottom portion of the frame depicted in FIG. 8.

Referring to FIGS. 8-11 there is shown various views of an especially preferred embodiment of the bottom portion 46 of the bracket. As shown in FIGS. 8 and 9, the bottom portion 46 includes a flat top surface 67, stops 68, a beveled front edges 69, and one or more tabs 70 extending from the top surface 67. The function of the tabs 70 will be to lock the bottom portion 46 within the channel 58 (see FIGS. 11A and 11B) of the top portion when it is inserted therein.

Figure 10:
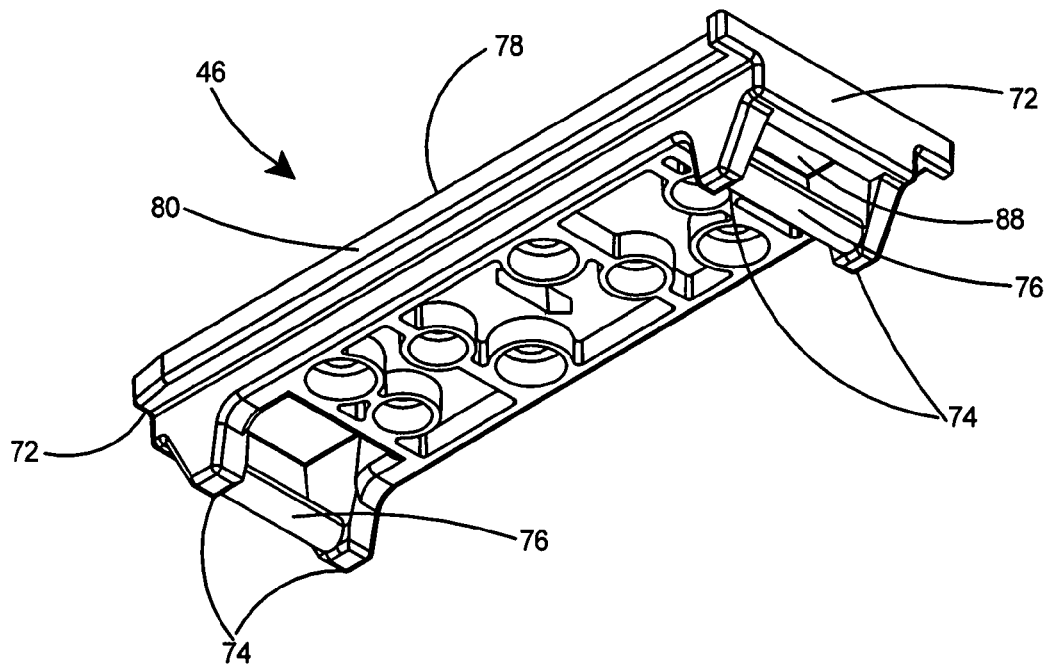
FIG. 10 is a lower perspective view of the bottom portion of the frame depicted in FIG. 8
Figure 11:
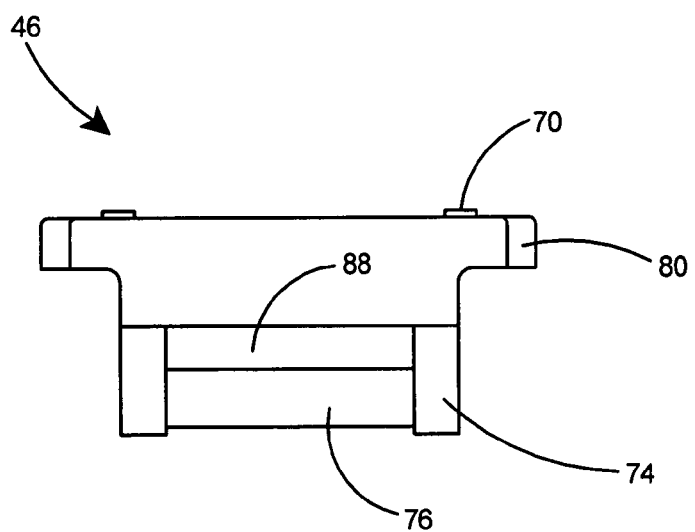
FIG. 11 is an end view of the bottom portion of the frame depicted in FIG. 8.

With reference to FIGS. 10 and 11, the bottom portion 46 further includes two ends 72 and two pairs of legs 74 extending downward from each end 72. A pin 76 extends between each pair of legs 74 at each end 72 of the bottom portion 46. The bottom portion 46 further includes an upper edge 78 and wings 80 extending outward at the upper edge 78. Although the pins 76 are depicted as being circular in cross-sectional shape, they could be hexagonal, octagonal, or similar shapes and perform equally as well.

With reference to FIG. 11A there is shown the lower part of the top portion 44 of the bracket and the bottom portion 46 in alignment with the channel 58 of the top portion to be slid therein. The beveled front edges 69 enable the bottom portion 46 to easily enter the channel 58. The guides 56 of the top portion 44 guide the wings 80 of the bottom portion 46 into the channel 58. As shown in FIG. 11B, after the bottom portion 46 is fully inserted into the channel 58 of the top portion 44, the tab 70 snaps into opening 66 and engages the flat edge 64. The bottom portion 46 of the bracket is then held securely to the top portion 44 with the bottom portion 46 locked within the channel 58 by the tab 70 and the stop 68.

Figure 12:
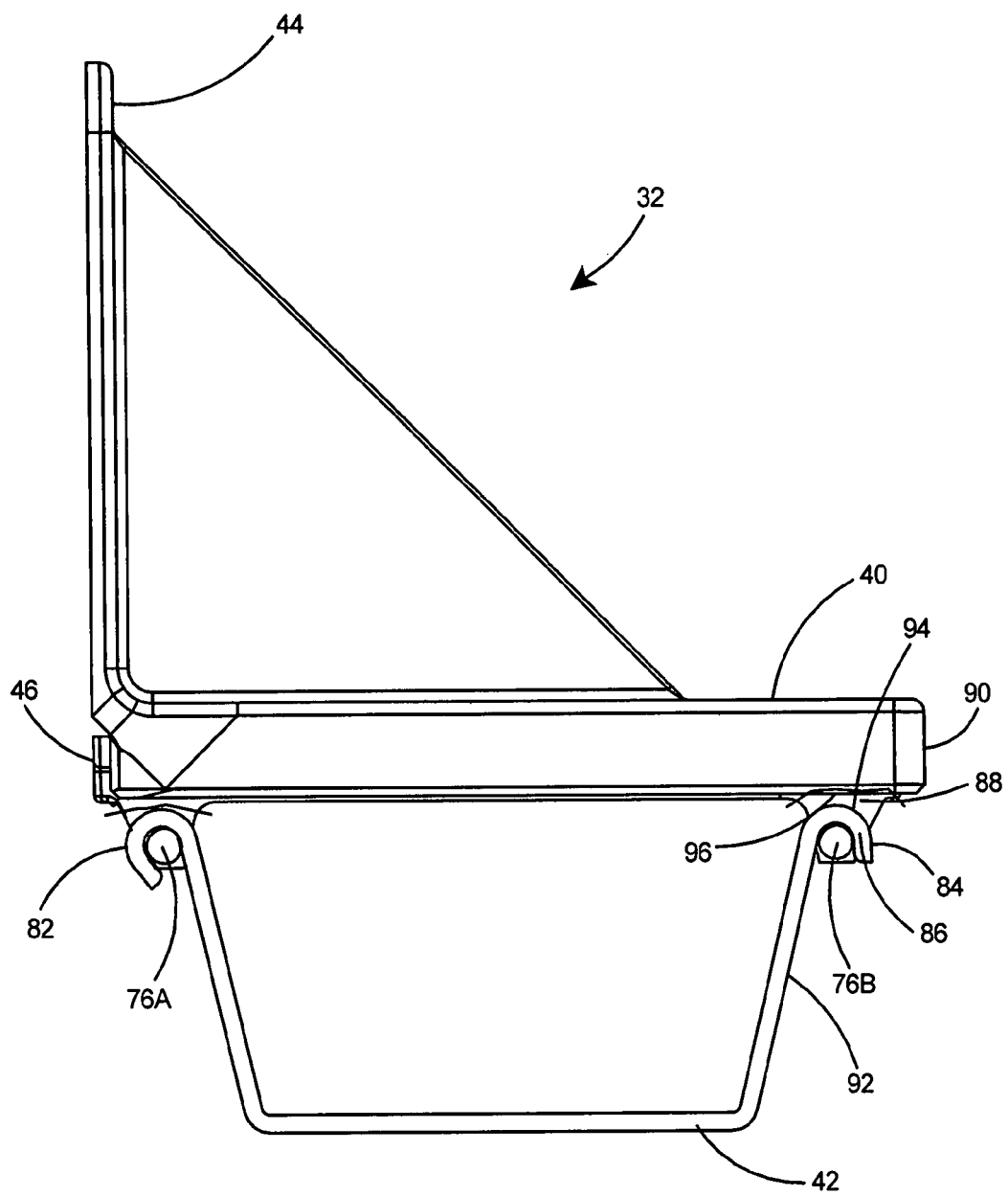
FIG. 12 is a side view of a preferred embodiment of a bracket according to the present invention with the hinge arm in the up and closed position and forward leg of the leg pairs cut away to show details of the pins.

Referring to FIG. 12 there is shown the preferred embodiment of the bracket 32 after the bottom portion 46 and top portion 44 are locked together to form an integral frame member 40 and the hinge arm 42 has been secured to the pins 76A, 76B. The hinge arm 42 is shown in the up and closed position. The hinge arm 42 includes a pivot end 82 and a closing end 84. The pivot end 82 is shaped into a hook shape and is snapped around the inner pin 76A, which is termed the inner pin as it will be oriented toward the inner side of the bracket 32 when it is mounted to a vertical surface (not shown). The closing end 84 of the hinge arm 42 includes a hook 86. The hinge arm 42 is preferably molded in one piece of flexible plastic therefore imparting flexibility to the pivot end 82 and enabling it to be snapped over inner pin 76A. The hinge arm 42 can therefore pivot around inner pin 76A. An opening 88 is provided on the outer end 90 of the bracket 32 between the outer pin 76B and the top portion 44 of the frame member 40. The opening 88 is also shown in FIGS. 8 and 10. Referring again to FIG. 12, the closing end 84 can be snapped onto the outer pin 76B at the outer end 90 of the bracket 32 to close the hinge arm 42 in the up position. The hinge arm 42, being constructed of flexible plastic, can be easily snapped onto the outer pin 76B to close the hinge arm 42 in the up position. Conversely, the outer leg 92 of the hinge arm 42 can be pushed upward and slightly inward until to release the hinge arm 42 from the outer pin 76B thereby allowing the hinge arm 42 to pivot downwards as the pivot end 82 pivots around the inner pin 76A (see FIG. 13). When the hinge arm 42 is in the up and closed position as shown in FIG. 12, a cable tray (see FIG. 15) will create a force downwards on the hinge arm 42 thereby holding it in the closed position.

Figure 13:
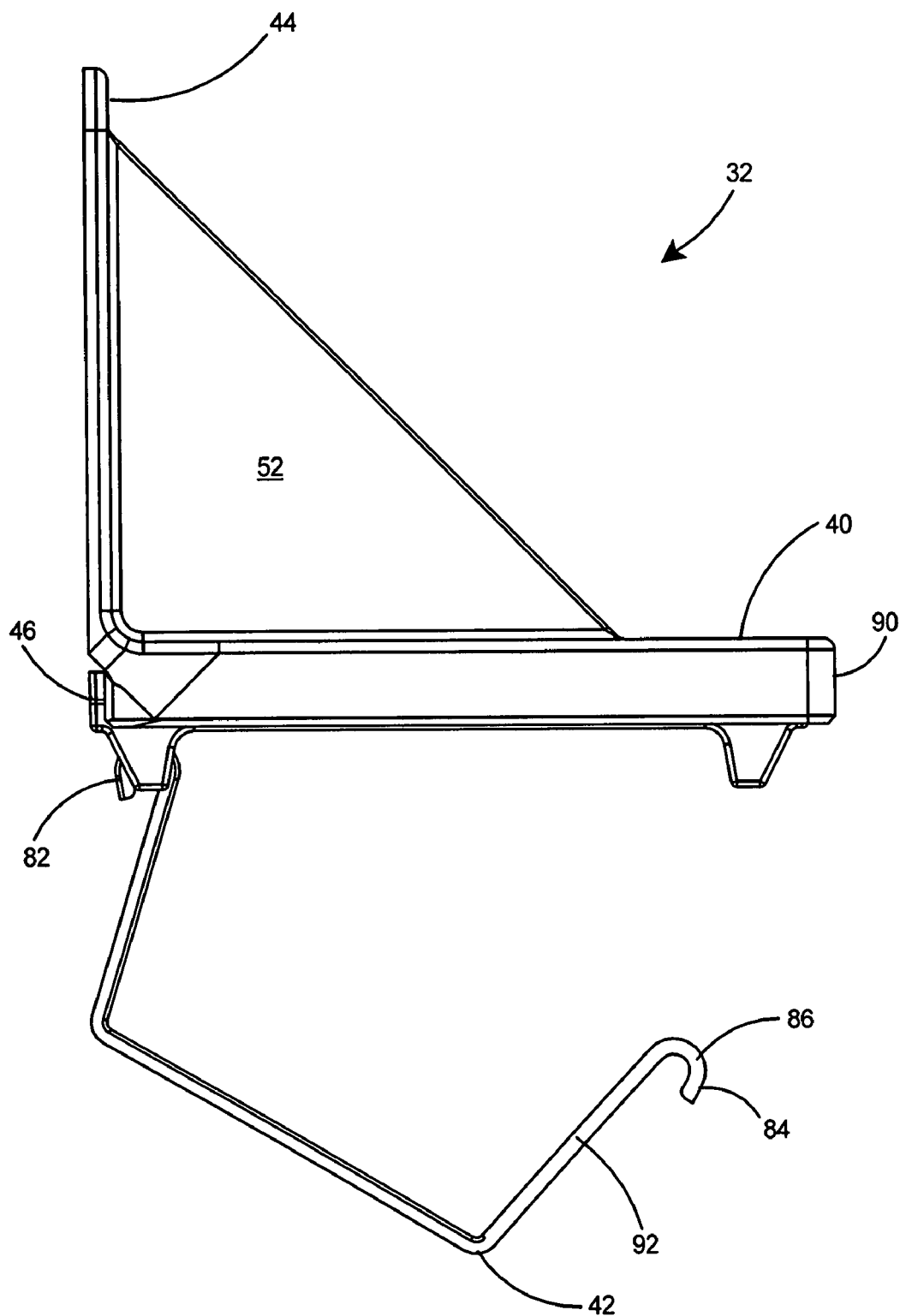
FIG. 13 is a side view of the bracket of FIG. 12 with the hinge arm released and pivoted downward.

With reference to FIG. 13, the bracket 32 is depicted with the hinge arm 42 pivoted downward and in the open position. With the hinge arm 42 open, a cable tray (not shown) can be fit within the hinge arm 42 of the bracket 32. Although the hinge arm 42 can be rotated to the open position to accept a cable tray (not shown), it is not necessary to do so as there is sufficient open area in a closed bracket 32 (see FIG. 12) that a cable tray may be inserted endwise into the opening between the hinge arm 42 and the frame member 40.

Figure 14:
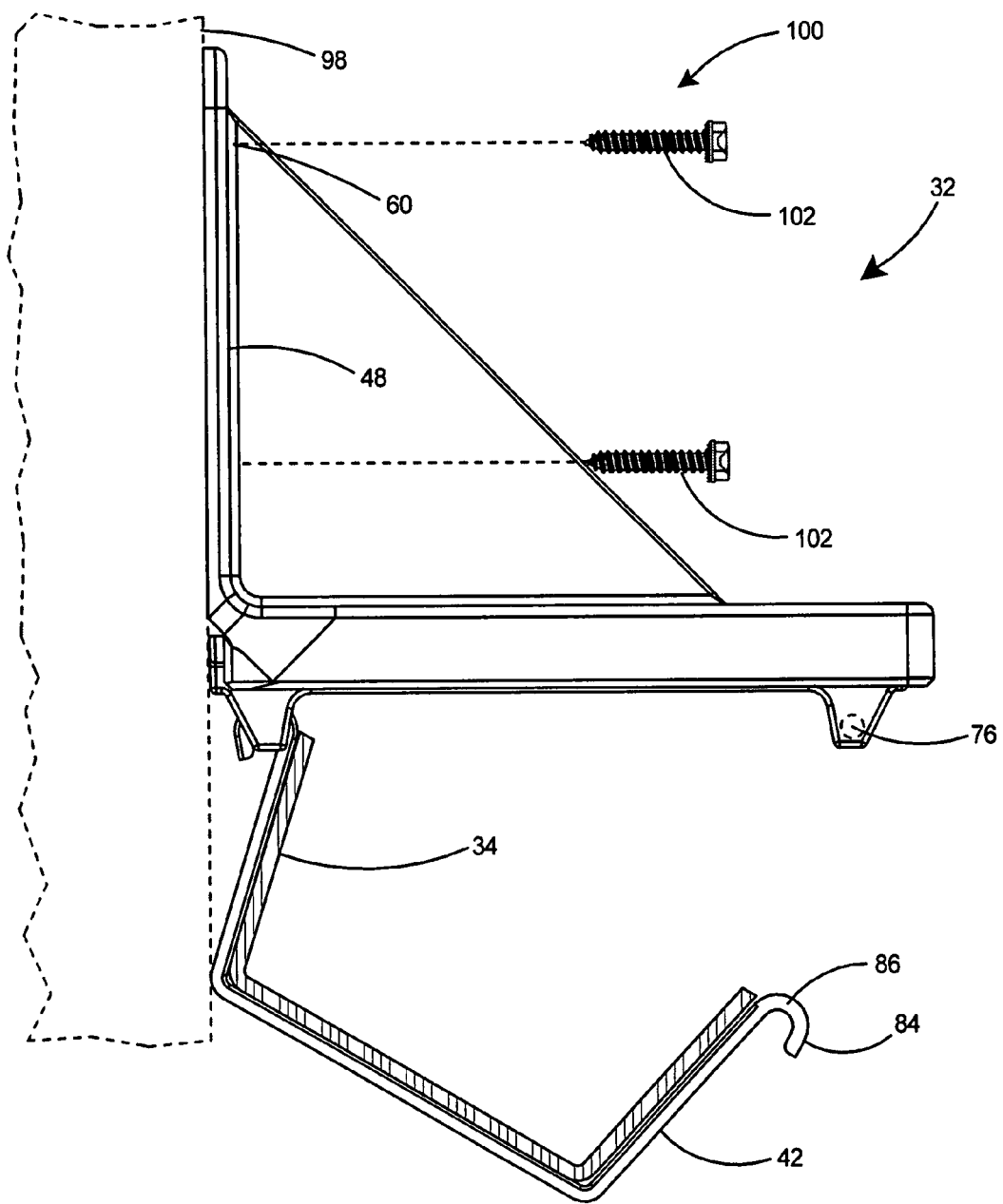
FIG. 14 is a side view of the bracket of FIG. 12 with the hinge arm pivoted downward and a cable tray loaded into the hinge arm.

Referring to FIG. 14, the bracket 32 is shown with a cable tray 34 loaded into the open hinge arm 42. The bracket 32 is shown being secured to a vertical surface 98 by a fastening arrangement 100 that includes fasteners 102 and the apertures 60 in the vertical arm 48 of the frame member 40.

Figure 15:
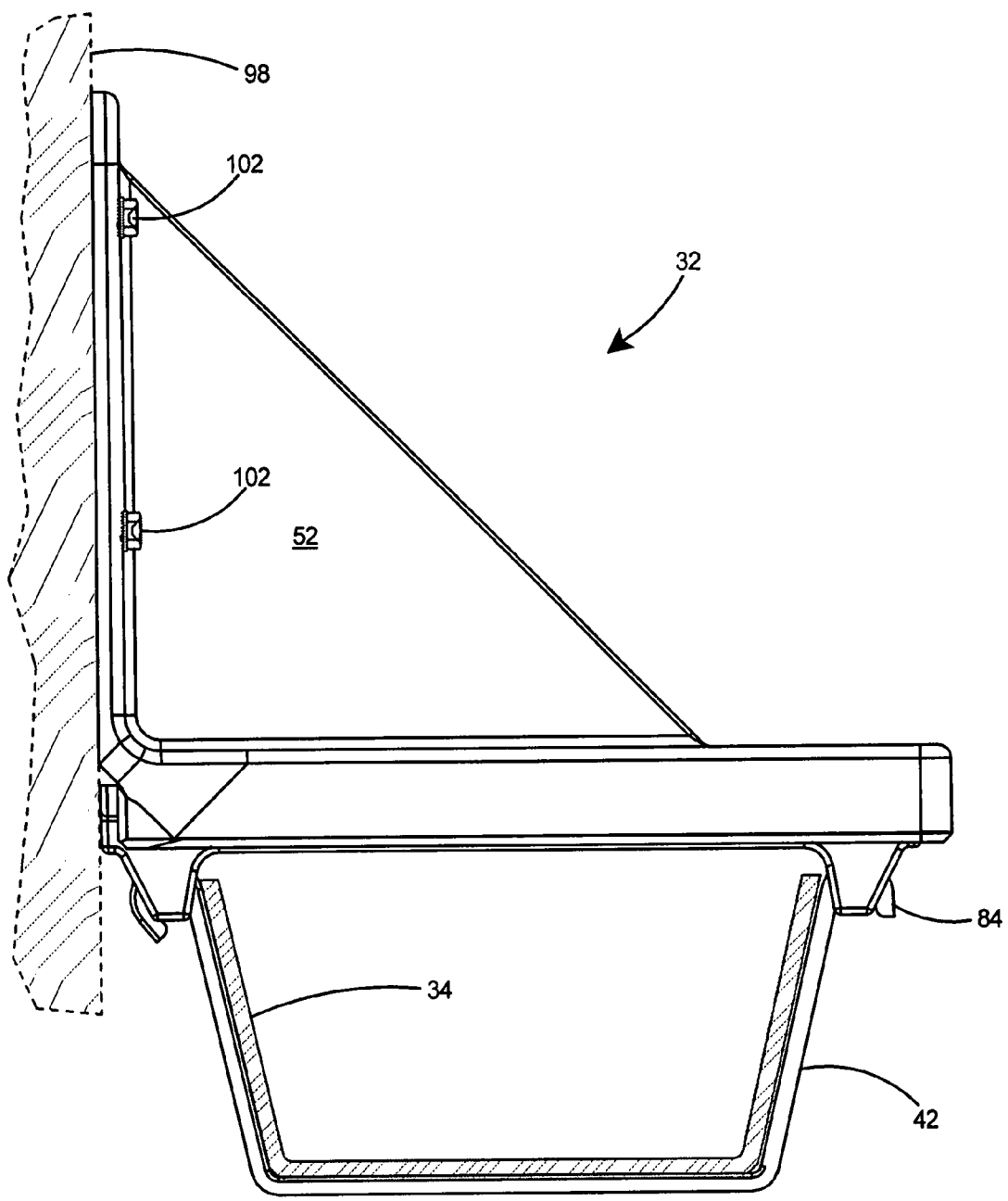
FIG. 15 is a side view of the bracket of FIG. 12 with the hinge arm in the up and closed position with a cable tray portion held therein.
Figure 28:
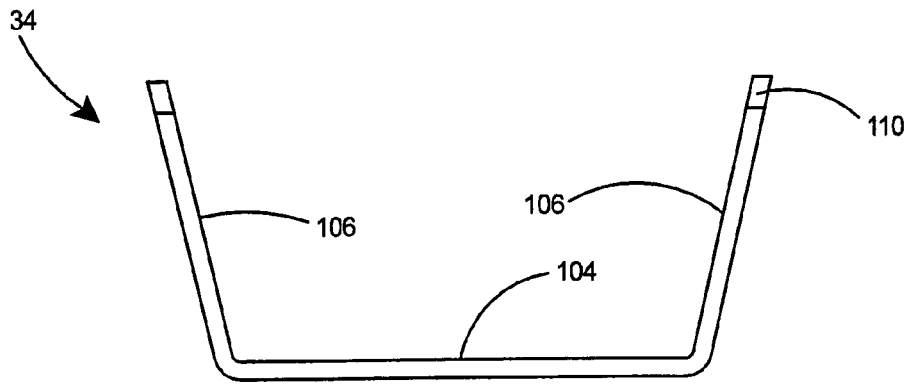
FIG. 28 is an end view of a preferred embodiment of a cable tray according to the present invention.
Figure 29:
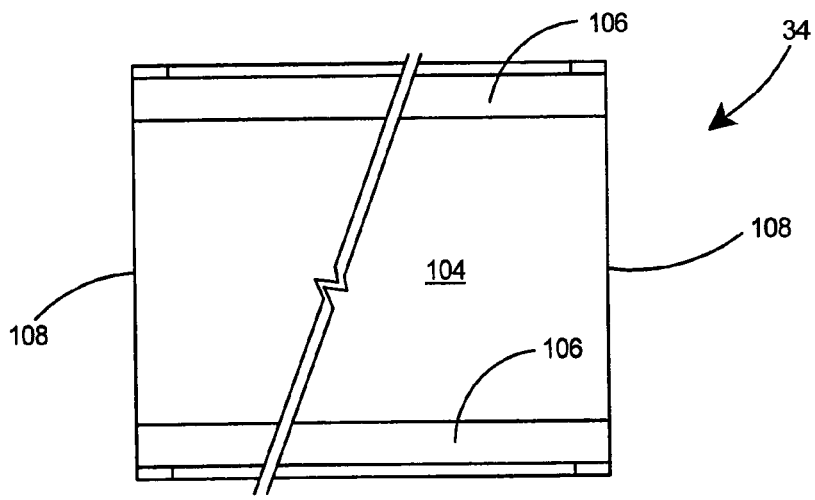
FIG. 29 is a top view of the cable tray of FIG. 28.
Figure 30:
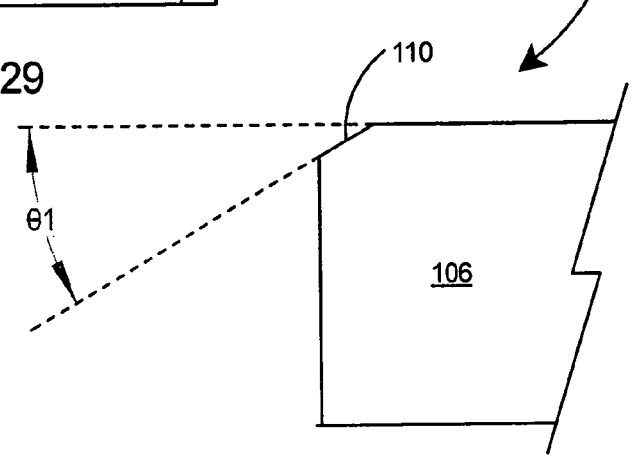
FIG. 30 is a side view of the end portion of the cable tray taken along line 30-30 of FIG. 29.

With reference to FIGS. 28-30, the cable tray 34 is substantially U-shaped and includes a bottom wall 104 and two sidewalls 106. The ends 108 of each cable tray 34 included beveled edges 110 on each sidewall 106 that are beveled at an angle of $\theta_1$ with respect to the top edge 112 of the sidewalls 106. Preferably angle $\theta_1$ is between 15 and 45 degrees. The cable tray 34 includes an outer profile substantially matching the inner profile of the hinge arm (not shown). The cable tray 34 is preferably molded in one piece of plastic and preferably includes a length of 6 feet or greater. The sidewalls 106 are sufficiently flexible to be depressed inwards with slight force. Therefore, when loaded into a hinge arm 42 in the open position as shown in FIG. 14, the hinge arm 42 and cable tray 34 combined may be pressed inward after which the hinge arm 42 may be rotated upward and the closing end 84 of the hinge arm 42 closed on the pin 76 of the frame member 40 to secure the hinge arm 42 in the closed position as shown in FIG. 15. the weight of the hinge arm 42 and the cable tray 34 holds the hinge arm in the up or closed position.

Figure 16:
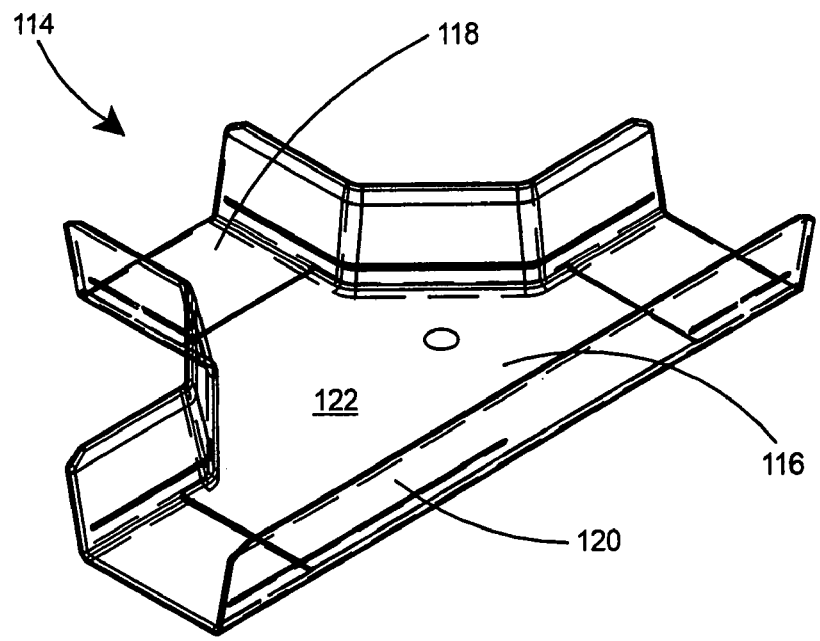
FIG. 16 is a perspective view of the preferred embodiment of a T-shaped cable tray portion according to the present invention.
Figure 17:
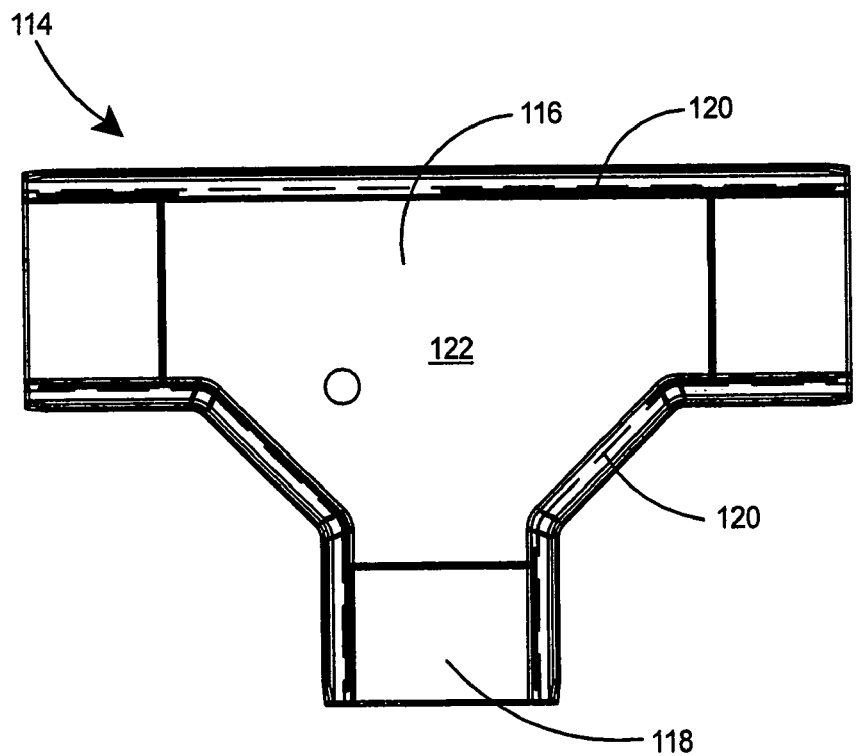
FIG. 17 is a top view of the T-shaped cable tray portion of FIG. 16.

With reference to FIGS. 16 and 17, the cable support assembly of the present invention may further include a T-shaped cable tray member 114. The T-shaped cable tray member 114 includes a straight first cable tray portion 116 and a second cable tray portion 118 branching perpendicular from the first cable tray portion 116. The T-shaped cable tray member 114 includes sidewalls 120 and a bottom wall 122. The T-shaped cable tray member 114 can be placed between two linear cable trays to provide a side-branching cable tray for routing cables in another direction if necessary for the particular application. The T-shaped cable tray member 114 is preferably molded of plastic in one piece.

Figure 18:
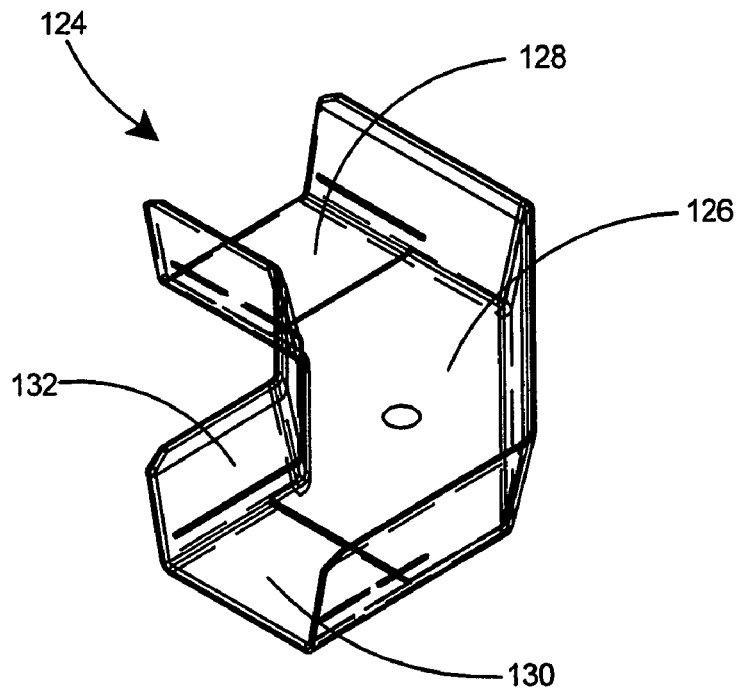
FIG. 18 is a perspective view of the preferred embodiment of a 90-degree bend cable tray portion according to the present invention.
Figure 19:
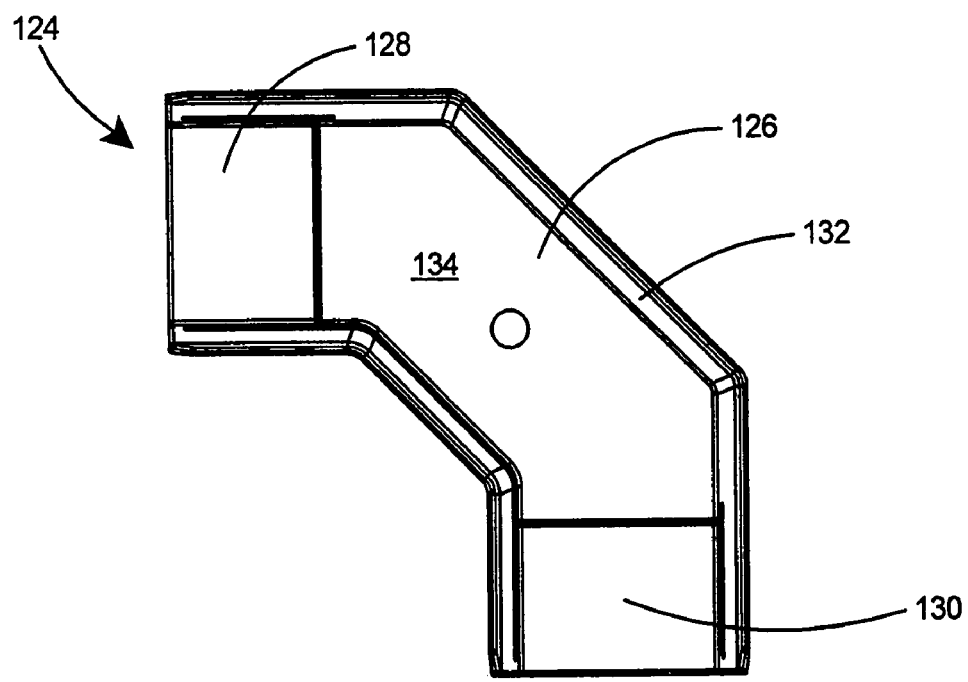
FIG. 19 is a top view of the 90-degree bend cable tray portion of FIG. 18.
Figure 20:
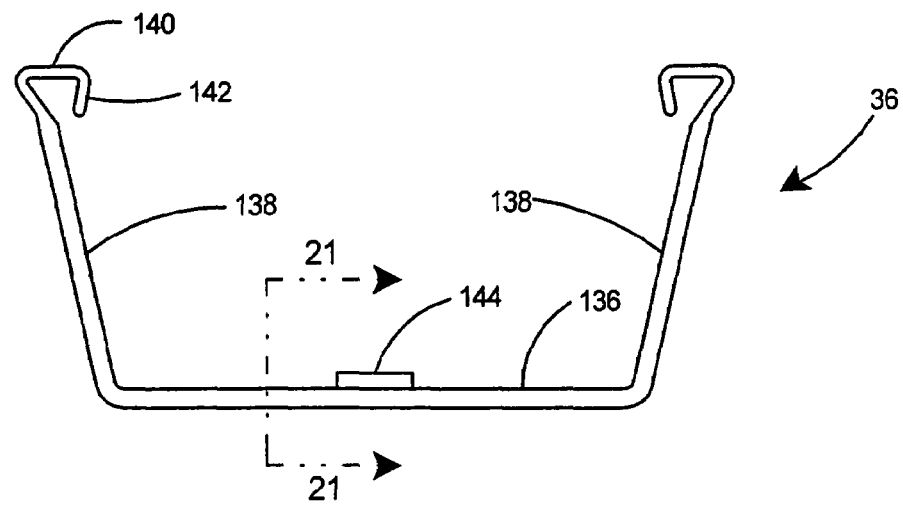
FIG. 20 is an end view of a preferred embodiment of a coupler according to the present invention.
Figure 21:
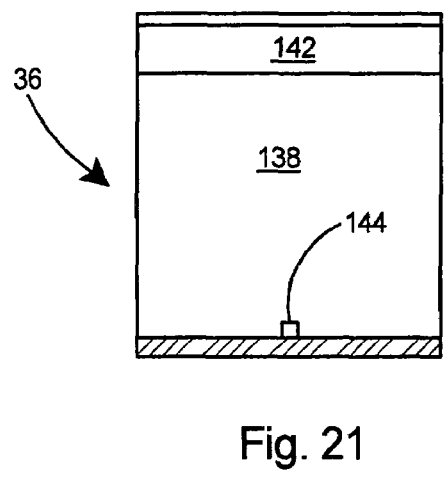
FIG. 21 is a side view of the coupler of FIG. 20.
Figure 22:
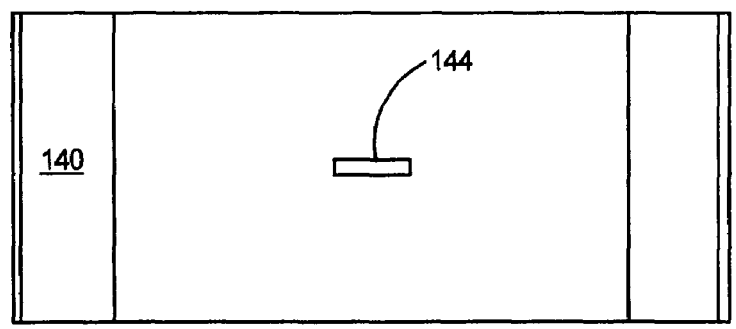
FIG. 22 is a top view of the coupler of FIG. 20.

Referring to FIGS. 18 and 19, the cable support assembly of the present invention may further include a 90-degree cable tray member 124. The 90-degree cable tray member 124 includes a straight first cable tray portion 126, a second cable tray portion 128 branching from the first cable tray portion at a 45-degree angle and a third cable tray portion 130 branching from the first cable tray portion 126 at a 45-degree angle. The 90-degree cable tray member 124 is used at the end of a straight section of cable trays to change the routing of the cables 90 degrees. The 90-degree cable tray member 124 includes sidewalls 132 and a bottom wall 134. The 90-degree cable tray member 114 is preferably molded of plastic in one piece.

With reference to FIGS. 20-23, the cable support assembly of the present invention may further include one or more couplers 36 for connecting two cable trays together at the ends or for connecting a cable tray to a T-shaped cable tray member or to a 90-degree cable tray member. The coupler 36 includes a bottom wall 136, two sidewalls 138, a top lip 140 extending inwardly from each the sidewall 138, and an inner lip 142 extending downward and inward from the top lip 140 toward each sidewall 138. The coupler 36 further includes a separator tab 144 extending upwards into the tray from the bottom wall 136. The separator tab 144 limits the distance a cable tray (see FIG. 23) may be inserted into the coupler 36.

Figure 26:
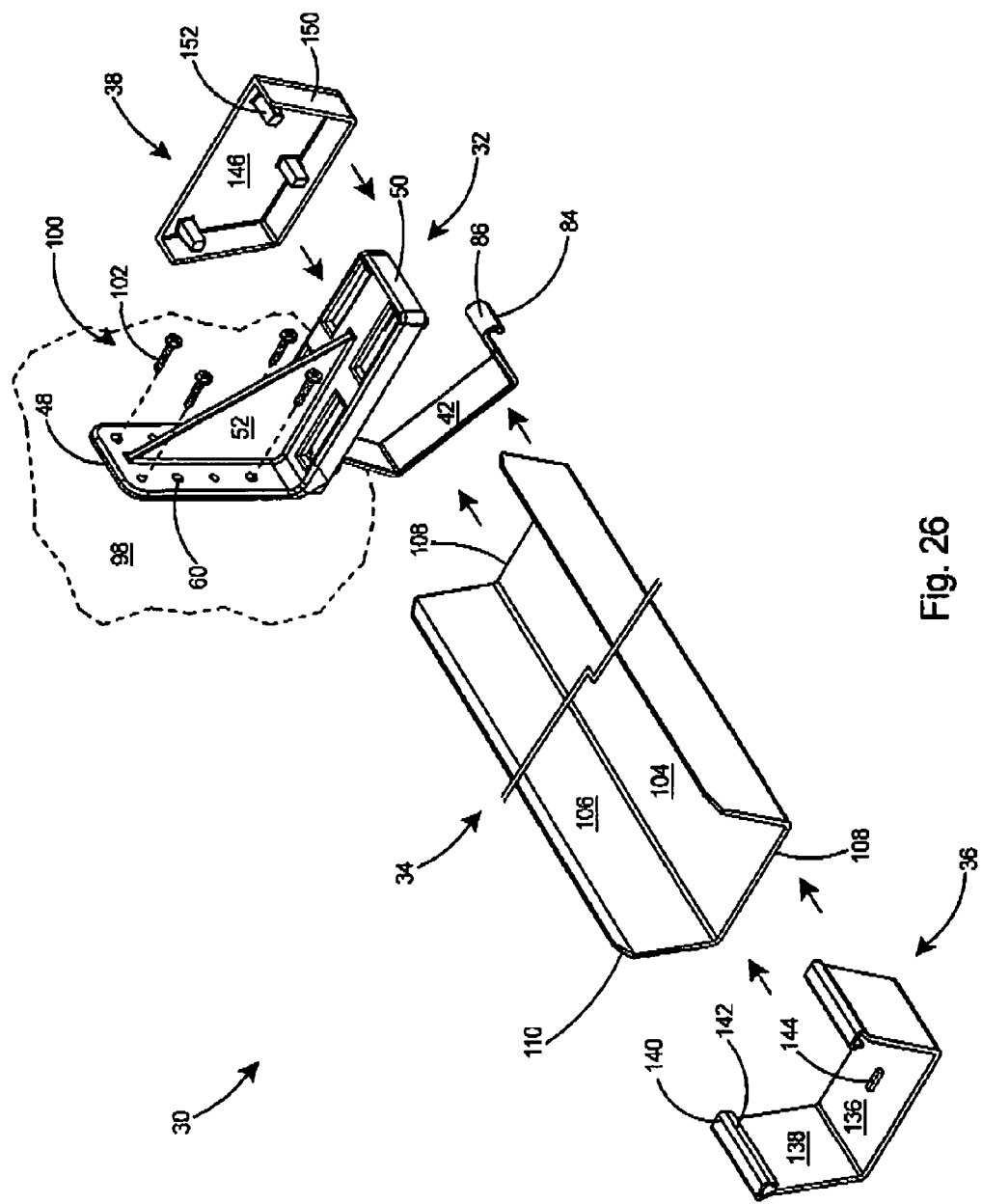
FIG. 26 is an exploded perspective view of a portion of a cable support assembly according to the present invention.

With reference to FIG. 26 there is shown a cable tray 34 having a coupler 36 inserted on its end 108 in order to attach another cable tray (not shown) thereto. The bottom wall 136 and two sidewalls 138 of the coupler 36 are of a slightly larger dimension than the bottom wall 104 and sidewalls 106 of the cable tray 34. Two of the cable trays 34 are capable of being connected together by sliding an end 108 of each of the cable trays 34 into one of the couplers 36. The beveled edges 110 of the cable tray 34 enable the cable tray ends 108 to easily enter the coupler 36. Each cable tray 34 advances into the coupler 36 until the bottom wall 104 of the cable tray 34 butts against the separator tab 144 of the coupler 36. As shown in FIG. 23, after a cable tray 34 is inserted into the coupler 36 the inner lip 142 bears against the sidewall 106 of the cable tray 34 and holds the cable tray 34 tightly within the coupler 36.

With reference to FIGS. 24 and 25, the cable support assembly of the present invention may include one or more end caps 38 for closing the open end of a cable tray or a connected chain of cable trays. The end cap 38 includes an end wall 146 having an outer edge 148, a peripheral wall 150 extending orthogonally from the outer edge 148 of the end wall 146, and one or more posts 152 extending orthogonally from the end wall 146 proximate the peripheral wall 150. As shown in FIG. 26, an end cap 38 may be slid onto an end 108 of a cable tray 34 to close off the end. The tight tolerance between the posts 152 and the peripheral wall 150 enables a tight frictional fit of the end cap 38 to the cable tray 34 when it is applied thereon. Preferably, the bottom wall 104 and the sidewalls 106 of the cable tray 34 include a thickness and the distance between the post 152 and the peripheral wall 150 of the end cap 38 are no more than 0.010 inch larger than the thickness of the bottom wall 104 and sidewalls 106 of the cable tray 34.

Referring to FIG. 26, the cable support assembly 30 includes one or more brackets 32, cable trays 34, couplers 36, and end caps 38. Although not shown in FIG. 26, the cable support assembly 30 may further include the T-shaped cable tray 114 of FIG. 16 or the 90-degree cable tray 124 of FIG. 18. The elongated cable trays 34 are preferably at least 6 feet in length.

To operate the present invention, brackets 32 are first mounted by the fastening arrangement 100 to a vertical surface or support 98 at the desired location for routing cables. After the brackets 32 are mounted in the desired location, either the cable trays 34 can be inserted endwise into the brackets 32 with the hinge arm 42 closed or the cable trays 34 may be placed in the open hinge arms 42 and the hinge arms 42 pivoted upwards and the closing ends 84 of the hinge arms closed in the up position. All variations of the cable tray are connected at their ends 108 to an adjacent cable tray end 108 using a coupler 36. The beveled edges 110 of the cable tray ends 108 enable easy initial insertion of the cable trays 34 and also enable a tight fit of the cable tray 34 within the coupler 36 as the top lips 140 of the coupler 36 are forced upward by the beveled edges 110 and the sidewalls 106 of the cable trays 34. End caps 38 are used to close off an end 108 of the cable tray 34. The close tolerance between the posts 152 and the peripheral wall 150 of the end cap 38 lock the end cap 38 onto the end of the cable tray 34.

With reference to FIG. 27 there is shown a portion of the preferred embodiment of an installed cable support assembly or cable raceway 30 according to the present invention. The brackets 32 secure the cable raceway 30 to a wall 98 or similar vertical support. The releasable hinge arms 42 may be rotated downward in order to perform inspection of cables (not shown) or to enable easy installation of additional cables as needed. The hinge arms 42 are simply pivoted upward and snapped and closed into the frame member 40 after inspection or installation of additional cables is complete. Conversely, if preferred, additional cables may be threaded through the cable raceway while the hinge arms 42 remain in the upward closed position. The brace 52 portion of the bracket strengthens the bracket so that it can better bear the load of the cable tray after it has been loaded with cables.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A cable support assembly comprising:
   a plurality of brackets, each said bracket including an L-shaped frame member and a hinge arm having two ends, one end of said hinge arm rotatably attached to said frame member and adapted to pivot downward from a closed upward position to an open downward position;
   said frame member includes a horizontal arm, a vertical arm having a planar mounting surface, and a brace member integral with and spanning between said vertical arm and horizontal arm;
   a fastening arrangement for securing each said bracket to a vertical support; and
   an elongated cable tray for carrying cables, said cable tray adapted to be received within and supported by said hinge arm.

2. The cable support assembly of claim 1 wherein
   said fastening arrangement includes apertures in said vertical arm; and
   fasteners for mounting through said vertical arm into the vertical support.

3. The cable support assembly of claim 1 wherein
   said frame member includes a top portion and a bottom portion;
   said top portion of said frame member includes a channel adapted to slidingly receive said bottom portion.

4. The cable support assembly of claim 3 wherein
   said top portion includes openings therein;
   said bottom portion includes a top surface and tabs extending from said top surface; and
   said tabs adapted to lock said bottom portion into said channel of said top portion when said bottom portion is slid into said channel.

5. The cable support assembly of claim 3 wherein, said top portion of said frame member, said bottom portion of said frame member, said hinge arm, and said elongated cable tray are each formed in one piece of plastic.

6. The cable support assembly of claim 1 wherein
   said frame member includes two ends and a pair of downward depending legs at each of said ends;
   a horizontal pin disposed between each said pair of legs at each end of said frame member.

7. The cable support assembly of claim 6 wherein said hinge arm includes a pivot end capable of engaging a first of said pins of said frame member and rotating about said first pin.

8. The cable support assembly of claim 7 wherein
said hinge arm includes a closing end capable of engaging a second of said pins on said frame member;
said closing end of said hinge arm includes a hook thereon whereby loading of said cable tray within said hinge arm closes said closing end of said hinge arm on said second pin.

9. The cable support assembly of claim 1 wherein said cable tray is substantially U-shaped and includes an outer profile substantially matching said hinge arm.

10. The cable support assembly of claim 1 including
a T-shaped cable tray member;
said T-shaped cable tray member including a straight first cable tray portion having a midpoint; and
a second cable tray portion branching from said first cable tray portion at said midpoint.

11. The cable support assembly of claim 1 including
a 90-degree cable tray member;
said 90-degree cable tray member including a straight first cable tray portion having two ends;
a second cable tray portion branching from a first end of said first cable tray portion at a 45-degree angle; and
a third cable tray portion branching from the opposite end of said first cable tray portion at a 45-degree angle.

12. The cable support assembly of claim 1 including
ends on said cable tray; and
a coupler for connecting said cable tray to a second cable tray, said cable trays connected together at said ends.

13. The cable support assembly of claim 12 including
a bottom wall and two sidewalls on said coupler;
a top lip extending inwardly from each said sidewall of said coupler; and
an inner lip extending downward and inward toward each said sidewall from said top lip of said coupler.

14. The cable support assembly of claim 13 wherein
each of said cable trays include a bottom wall and two sidewalls;
said bottom wall and two sidewalls of said coupler of a slightly larger dimension than said bottom wall and said sidewalls of said cable trays; and
said cable trays capable of being connected together by sliding an end of each of said cable trays into said coupler.

15. The cable support assembly of claim 14 including
a separator tab extending upwards from said bottom wall of said coupler; and
said separator tab limiting the distance one of said cable trays may be inserted in said coupler.

16. The cable support assembly of claim 14 including an end cap for closing an open end of one of said cable trays.

17. The cable support assembly of claim 16 wherein
said end cap includes an end wall having an outer edge;
a peripheral wall extending orthogonally from the outer edge of said end wall; and
one or more posts extending orthogonally from said end wall proximate said peripheral wall,
whereby sliding of said end cap onto an end of one of said cable trays enables a frictional fit of said end cap to said cable tray.

18. The cable support assembly of claim 17 wherein
said bottom wall and said sidewalk of said cable trays include a thickness; and
the distance between one of said posts and said peripheral wall of said end cap is no more than 0.010 inch larger than the thickness of said bottom wall and said sidewalls of one of said cable trays.

19. A method of supporting cables from a vertical support including the steps of:
(a) providing a plurality of brackets, each of said brackets including an L-shaped frame member and a hinge arm, said frame member including a first pin and a second pin, a horizontal arm, a vertical arm having a planar mounting surface, and a brace member integral with and spanning between said vertical arm and horizontal arm, said hinge arm pivotally attached at said first pin of said frame member, said hinge arm including a second end having a hook thereon adapted to close on said second pin of said frame member, said frame member including a fastening arrangement for securing each of said brackets to a vertical surface;
(b) providing a plurality of elongated cable trays for carrying cables adapted to be received within said hinge arm, each of said cable trays including an interior channel for receiving and supporting therein electrical, communication, or data cables;
(c) securing each of said brackets to the vertical surface using said fastening arrangement, each of said brackets in linear alignment along the vertical surface;
(d) rotating said hinge arm downward from said frame member on each of said brackets;
(e) placing a first of said cable trays within said hinge arms of each of said brackets;
(f) rotating said hinge arms and said first cable tray upwards;
(g) pressing said second end of said hinge arm inward to slightly compress said first cable tray;
(h) pressing said second end of said hinge arm outward until said hook on said second end of said hinge arm closes on said second pin of said frame member;
(i) providing a coupling member for securing together two of said cable trays;
(j) repeating steps (a) through (h) above for a second cable tray in linear alignment with said first cable tray;
(k) sliding a first end of said coupling member onto an end of said first cable tray;
(l) sliding said second cable tray into a second end of said coupling member; and
(m) repeating steps (j) through (l) as needed until a desired length of supported cable trays is reached.

* * * * *